(12) United States Patent  
Danesi et al.

(10) Patent No.: US 8,781,919 B2
(45) Date of Patent: Jul. 15, 2014

(54) DATA ROW PACKING APPARATUS, SYSTEMS, AND METHODS

(75) Inventors: Lorenzo Danesi, Richmond Hill (CA); Zhenrong Li, Mississauga (CA); Blazimir Radovic, Toronto (CA)

(73) Assignee: Teradata US, Inc., Dayton, OH (US)

( * ) Notice: Subject to any disclaimer, the term of this patent is extended or adjusted under 35 U.S.C. 154(b) by 688 days.

(21) Appl. No.: 12/912,128

(22) Filed: Oct. 26, 2010

(65) Prior Publication Data

US 2011/0040773 A1    Feb. 17, 2011

Related U.S. Application Data

(63) Continuation-in-part of application No. 11/967,621, filed on Dec. 31, 2007, now Pat. No. 7,856,382.

(51) Int. Cl.
 *G06F 7/00* (2006.01)
 *G06F 17/30* (2006.01)
 *G06F 7/24* (2006.01)

(52) U.S. Cl.
 CPC .... *G06F 17/30067* (2013.01); *G06F 17/30864* (2013.01); *G06F 17/30595* (2013.01); *G06F 17/30008* (2013.01); *G06F 7/24* (2013.01); *Y10S 707/99931* (2013.01); *Y10S 707/99932* (2013.01); *Y10S 707/99933* (2013.01); *Y10S 707/99934* (2013.01); *Y10S 707/99935* (2013.01); *Y10S 707/99936* (2013.01); *Y10S 707/99937* (2013.01); *Y10S 707/99938* (2013.01); *Y10S 707/99939* (2013.01)
 USPC .............. 705/28; 707/999.001; 707/999.002; 707/999.003; 707/999.004; 707/999.005; 707/999.006; 707/999.007; 707/999.008; 707/999.009

(58) Field of Classification Search
 CPC ................... G06F 17/30067; G06F 17/30595; G06F 17/30864; G06F 17/30008; G06F 7/24
 USPC ......... 707/2, 4, 100, 102, 104, 702, 713, 756, 707/999.001–999.009; 1/1
 See application file for complete search history.

(56) References Cited

U.S. PATENT DOCUMENTS

| | | | | |
|---|---|---|---|---|
| 5,325,525 | A * | 6/1994 | Shan et al. | 718/104 |
| 6,067,542 | A * | 5/2000 | Carino, Jr. | 1/1 |
| 7,024,414 | B2 * | 4/2006 | Sah et al. | 1/1 |
| 7,136,850 | B2 | 11/2006 | Keller et al. | |
| 7,188,098 | B2 * | 3/2007 | Chen et al. | 1/1 |
| 7,283,982 | B2 | 10/2007 | Pednault | |
| 7,376,656 | B2 * | 5/2008 | Blakeley et al. | 717/108 |
| 8,332,373 | B1 * | 12/2012 | Milby | 707/702 |

(Continued)

OTHER PUBLICATIONS

"U.S. Appl. No. 11/967,621, Non Final Office Action Mailed Oct. 1, 2009", 15 pgs.

(Continued)

*Primary Examiner* — Olusegun Goyea
(74) *Attorney, Agent, or Firm* — Schwegman Lundberg & Woessner, P.A.

(57) ABSTRACT

Apparatus, systems, and methods may operate to receive a designation of multiple rows to supply data to a single user defined function, which is made available in a structured query language SELECT statement. Further activities may include retrieving the data from at least one storage medium, packing each of the multiple rows having a common key into a single row, and transforming the data from a first state into a second state by applying the single function to the data using a single access module processor. Other apparatus, systems, and methods are disclosed.

18 Claims, 8 Drawing Sheets

(56) References Cited

U.S. PATENT DOCUMENTS

| | | |
|---|---|---|
| 2003/0037048 A1* | 2/2003 | Kabra et al. ............... 707/4 |
| 2004/0128287 A1 | 7/2004 | Keller et al. |
| 2004/0128289 A1* | 7/2004 | Cochrane et al. ........... 707/4 |
| 2005/0010093 A1* | 1/2005 | Ford et al. .................. 600/345 |
| 2005/0044063 A1* | 2/2005 | Barsness et al. ........... 707/2 |
| 2005/0065926 A1* | 3/2005 | Chen et al. ................. 707/4 |
| 2005/0080820 A1* | 4/2005 | Koppel et al. ............. 707/104.1 |
| 2005/0177579 A1* | 8/2005 | Blakeley et al. ............ 707/100 |
| 2005/0182800 A1* | 8/2005 | Ashwin et al. ............. 707/203 |
| 2006/0041544 A1* | 2/2006 | Santosuosso ............... 707/4 |
| 2006/0136415 A1* | 6/2006 | Ramsey et al. ............. 707/7 |
| 2007/0022136 A1 | 1/2007 | Keller et al. |
| 2008/0059115 A1* | 3/2008 | Wilkinson .................. 702/179 |
| 2008/0189239 A1* | 8/2008 | Bawa et al. ................. 707/2 |
| 2008/0250057 A1* | 10/2008 | Rothstein et al. .......... 707/102 |
| 2008/0301148 A1* | 12/2008 | Lee et al. ................... 707/10 |
| 2008/0306903 A1* | 12/2008 | Larson et al. .............. 707/2 |
| 2009/0018982 A1* | 1/2009 | Morrison .................... 706/12 |
| 2009/0018989 A1* | 1/2009 | Chang et al. ............... 707/2 |
| 2009/0019005 A1* | 1/2009 | Hu et al. .................... 707/3 |
| 2009/0077019 A1* | 3/2009 | Todd .......................... 707/2 |
| 2009/0077253 A1* | 3/2009 | Ashwin et al. ............. 709/231 |
| 2009/0177520 A1* | 7/2009 | Bateni et al. ............... 705/10 |
| 2009/0177559 A1 | 7/2009 | Kim et al. |
| 2009/0187584 A1* | 7/2009 | Johnson et al. ............ 707/100 |
| 2011/0040773 A1* | 2/2011 | Danesi et al. .............. 707/756 |

OTHER PUBLICATIONS

"U.S. Appl. No. 11/967,621, Final Office Action mailed Apr. 1, 2010", 17 pgs.

"U.S. Appl. No. 11/967,621, Response filed Jan. 4, 2010 to Non Final Office Action mailed Oct. 1, 2009", 8 pgs.

"U.S. Appl. No. 121/967,621, Response filed Jun. 24, 2010 to Final Office Action mailed Apr. 1, 2010", 11 pgs.

* cited by examiner

DATA ROW PACKING APPARATUS, SYSTEMS, AND METHODS

CLAIM OF PRIORITY

This application is a Continuation-In-Part of and claims the benefit of priority under 35 U.S.C. §120 to U.S. patent application Ser. No. 11/967,621, entitled "AGGREGATE USER DEFINED FUNCTION (UDF) PROCESSING FOR MULTI-REGRESSION", filed on Dec. 31, 2007, which is hereby incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example code, screen shots, and images described below, and in any drawings appended hereto: Copyright 2010 Teradata Corporation of Miamisburg, Ohio—All Rights Reserved.

BACKGROUND

It is not uncommon to see the amount of data associated with a business venture grow at an exponential pace. For example, enterprises are increasingly capturing, storing, and mining a plethora of information related to communications with their customers. Often this information is stored and indexed within databases. Once the information is indexed, queries are developed on an as-needed basis to mine the stored information to satisfy a variety of organizational goals, such as planning, analytics, and reporting.

Often, the information stored and indexed is created, mined, updated, and manipulated by application programs created by developers on behalf of analysts. These programs are referred to as user-defined functions (UDF's).

The information stored in the databases also provides enterprises with an opportunity to derive relationships or patterns from that information; the relationships and patterns can be defined by functions. These functions, when supplied certain input variables, transform input data into projected output values which the enterprises may rely upon for its business operations. Such scenarios may be useful in projecting the impact of sales given certain anticipated conditions, for example. Mathematical regression algorithms are sometimes used in this approach.

One issue with regression analysis is the large amount of information typically needed to produce meaningful and reliable results. The information may be stored across multiple rows, perhaps in a system that uses a "shared nothing" architecture, in which each node is independent and self-sufficient, and there is no single point of contention across the system. Such benefits sometimes come at a cost—the shared nothing architecture may provide relatively slow access to information stored across the system. For example, when multiple rows of data serve a single business calculation, the communication of data between nodes can be sluggish.

DETAILED DESCRIPTION

To enhance operational efficiency, as well as to address some of the other challenges described above, various embodiments provide an efficient way to pack multiple rows supporting data for a UDF application. In a shared nothing architecture system, the UDF application may be operating so that different copies of UDF execution can't share their data.

In various embodiments, multiple rows that have the same key can be fed into the same processor, including a virtual processor, such as an access module processor (AMP). This gives every copy of the UDF execution the opportunity to pack rows together into a single row, including packing multiple rows into single variable byte length (VARBYTE) data type variable. If desired, the single row of data can then be fed to the main UDF application based on a key join operation. Prior to describing these data row packing embodiments, techniques for processing data using multi-regression will be presented.

Thus, in some embodiments, techniques for aggregate UDF processing used with multi-regression are provided. According to an embodiment, a method for an aggregate UDF used in multi-regression analysis will be described. In this case, an intermediate storage structure is initialized to house regression input variables for multiple nodes of a database environment. Data is gathered from a database into the intermediate storage structures on each node. YearWeek data (e.g., data formatted as YYYYWW, such as 201001 for the first week of the year 2010) found on each of the nodes is merged together, via the intermediate storage structure, and the merged data pertaining to a same product stock keeping unit (SKU). Merged YearWeek data can be placed on a particular node of the database environment. At this point, a regression service can be processed for each SKU on each node.

Multi-Regression Analysis

A multi-regression analysis technique has been employed to develop a causal model to establish a cause-effect relationship between demand and the potential influencing factors. The model can also be used to calculate promotional uplift and demand forecast based on the casual relationship. In some embodiments, a novel aggregate UDF is presented for improving processing throughput of multi-regression analysis.

A Varbyte Packing System (VPS) is a data packing method that can be used to input a large number of data items into a tabular UDF. The packing is useful for tabular UDFs since in some cases they accept a maximum of 128 input parameters at a time. Multi-regression involves taking several factors from several rows of observations, which are fed in as a single record input into the tabular UDF.

Figure 1:
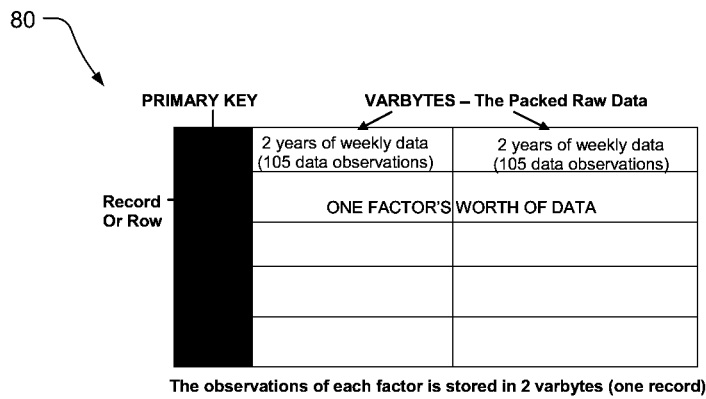
FIG. 1 includes a table with a multiple-variable byte length representation of data, and processing phases showing the aggregation of data according to various embodiments of the invention.
Figure 1:
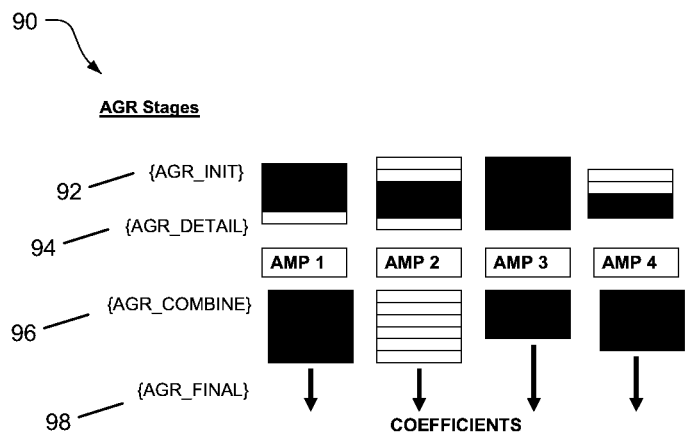

FIG. 1 includes a table 80 with a multiple-variable byte length representation of data, and processing phases 90 showing the aggregation of data according to various embodiments of the invention. In the table 80, four years of observations of each factor that are to be packed into two varbytes are shown, with each VARBYTE storing up to 105 observations. In this case, the actions involved might include the following, for a tabular UDF regression performed on a record by record basis:

pack the raw data: response variable (weekly sales) and independent factors (price, promotional flags . . . ).

pack each of the observations at the SKU level into two large VARBYTES per factor, each containing 105 data observations (the scheme for this example may be due to the fact that each VARBYTE maps two years, each with 52-53 weeks, of history.

pack all the data points for all factors into one record, for each regression model.

When this approach is used, complications may arise, perhaps due to the overhead of packing VARBYTE variables. Additional problems may include the need for full or left outer join operations to estimate missing data, where outer joins are expensive and slow. Another difficulty encountered when using varbytes as the input to a tabular UDF involves oversized rows (records). This may result from packing all observations of factors pertaining to a particular SKU, so that that row reference array scans are less effective, and the system input/output hardware is busier.

To address these complications, an aggregate UDF can be used, to collect and summarize data across many records, yielding a single output. Four processing phases 90 are addressed: AGR_INIT, AGR_DETAIL, AGR_COMBINE, and AGR_FINAL. Each will be described in the following paragraphs.

In the AGR_INIT phase 92, there is the initial setup of the regression intermediate storage structure. This may occur once per SKU, to set up the temporary space for use on a particular AMP. For better performance, data may be distributed according to grouped columns, among four AMPs (in this example), which may serve to reduce merging activities in later phases.

In the AGR_DETAIL phase 94, which may be run once per record, data is accumulated into an intermediate storage structure. In the AGR_COMBINE phase 96, YearWeek data found on the different AMPs and pertaining to the same SKU is merged. The resulting output is fed into a single AMP. In the AGR_FINAL phase 98, the regression is run for each SKU on each AMP.

Thus, multiple aggregated result rows can be generated from the aggregate function. The result rows are grouped by the specified key. The output rows can then be fed into a Table UDF that uses packed row data by joining according to the specified key with other input data for final processing. This can be accomplished using two UDFs, aggregate and detail, in order to increase performance.

The use of aggregate UDFs may present several advantages. For example, the amount of setup used to run a regression function may be reduced. There may be no need t pack variables into VARBYTE data types. And there may be performance gains, since there is no overhead added by pivoting and shifting large amounts of data to form single SKU records, and there are no oversized/large rows. Indeed, in testing the gains made by using the aggregate UDF of several embodiments, versus the conventional tabular UDF, it has been determined that the aggregate UDF implementation can be as much as three times faster. It is within this context that specific embodiments of the above-discussed aggregate UDF and its processing are discussed with reference to the FIGS. 2-4.

Figure 2:
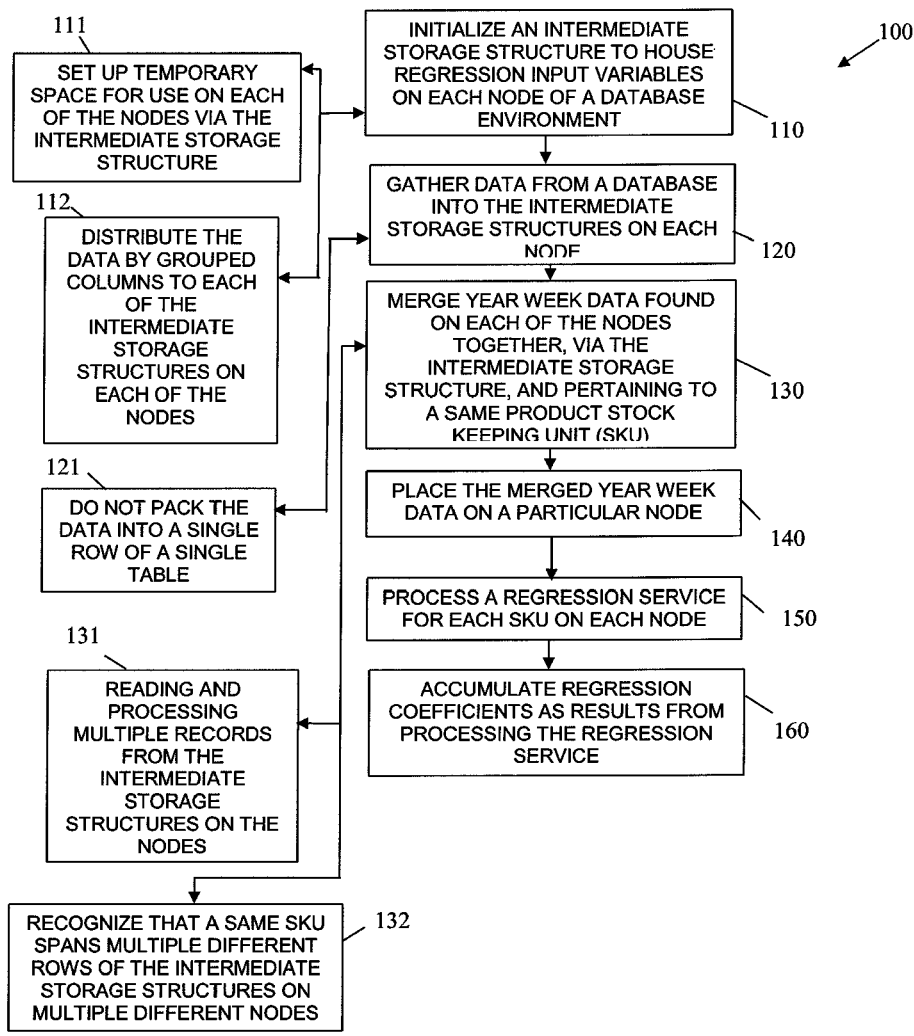
FIG. 2 is a diagram of a method for aggregate user-defined function (UDF) processing used with multi-regression, according to an example embodiment.

FIG. 2 is a diagram of a method 100 for aggregate user-defined function (UDF) processing used with multi-regression, according to an example embodiment. The method 100 (hereinafter "aggregate UDF service") is implemented in a machine-accessible or computer-readable medium as instructions that when executed by a plurality of machines (e.g., computers, processing devices, etc.) performs the processing depicted in FIG. 2. Moreover, the aggregate UDF service is accessible over a network. The network may be wired, wireless, or a combination of wired and wireless.

A "database" as used herein is a relational database, or a collection of databases organized as a data warehouse. According to an embodiment, the database may comprise a Teradata® product or service distributed by Teradata Corporation of Dayton, Ohio.

The database includes a variety of enterprise information organized in tables. One type of information is referred to as an "entity." An entity is something that can be uniquely identified (e.g., a customer account, a customer name, a store, a product, a household name, a logical grouping of certain types of customers, etc.). Each entity includes related information such as sales, expenses, inventories, transaction history, etc. In fact, the relationships and types of information can vary and can be configured in any manner desired by an enterprise.

It is within this context that the processing associated with the aggregate UDF service is now described in detail with reference to the FIG. 2.

Essentially, the aggregate UDF service collects and summarizes data (information) across many records and yields a single output. This is achieved via breaking the processing into four primary phases. In phase one the aggregate UDF service initializes processing; phase two collects details, phase three combines the details, and phase four produces the final regression results associated with regression analysis algorithms or services.

Traditionally, the approach has been to pack a large number of data items (fields) from a relational database into a single row of a table to perform regression analysis. This had some obvious performance issues, such as the UDF itself could only process a finite number of variables, such as 128. Yet, with regression analysis the more factors or variables the more reliable results can be. Generally, several voluminous years of data is passed to a regression analysis algorithm via a single tabular UDF. There is overhead associated with the complicated packing of variables to avoid system limits and processing is slow with increasingly encumbered Input/Output (I/O) performance.

The aggregate UDF service and its four processing phases solve these problems by reading and processing multiple rows, such that packing and single row processing is no longer needed.

At 110, the aggregate UDF service initializes an intermediate storage structure to house regression input variables on each node of a database environment. So, in a multiple processor environment, each node is utilized and a storage structure is set up to house data that is used in a particular regression analysis scenario.

According to an embodiment, at 111, the aggregate UDF service essentially sets up temporary space for use on each of the nodes via the intermediate storage structure. Thus, each node/process has the necessary space and storage to handle its piece of the regression input data that is to be used in the multi-regression analysis.

In an embodiment, at 112, the aggregate UDF service distributes the data by grouped columns to each of the intermediate storage structures on each of the nodes. This may improve performance and reduce merging activities in later processing steps, as discussed below.

At 120, the aggregate UDF service gathers data from a database into the intermediate storage structures on each node. This is the input data being analyzed for the regression analysis and is what conventionally was packed into a single row of a single table. Here, multiple rows are permitted on multiple nodes and the data is housed in intermediate storage structures on each of the nodes.

So, at 121, the aggregate UDF service does not pack into a single row of a single table as was discussed above.

At 130, the aggregate UDF service merges YearWeek data found on each of the nodes together, via the intermediate storage structure, and pertaining to a same product stock keeping unit (SKU).

At 131, the aggregate UDF service reads and processes multiple records from the intermediate storage structures on the nodes. Also, at 132, the aggregate UDF service recognizes that a same SKU spans multiple different rows of the intermediate storage structures on multiple different nodes.

At 140, the aggregate UDF service processes a multi-regression service for each SKU on each node. Thus, at 150, the aggregate UDF service accumulates and outputs regression coefficients as results from processing the regression service.

The processing of the aggregate UDF service reads and processes multiple rows rather than one monolithic row of a single table. As discussed previously, this scenario may result in a 300% or more performance improvement over the conventional approach.

Figure 3:
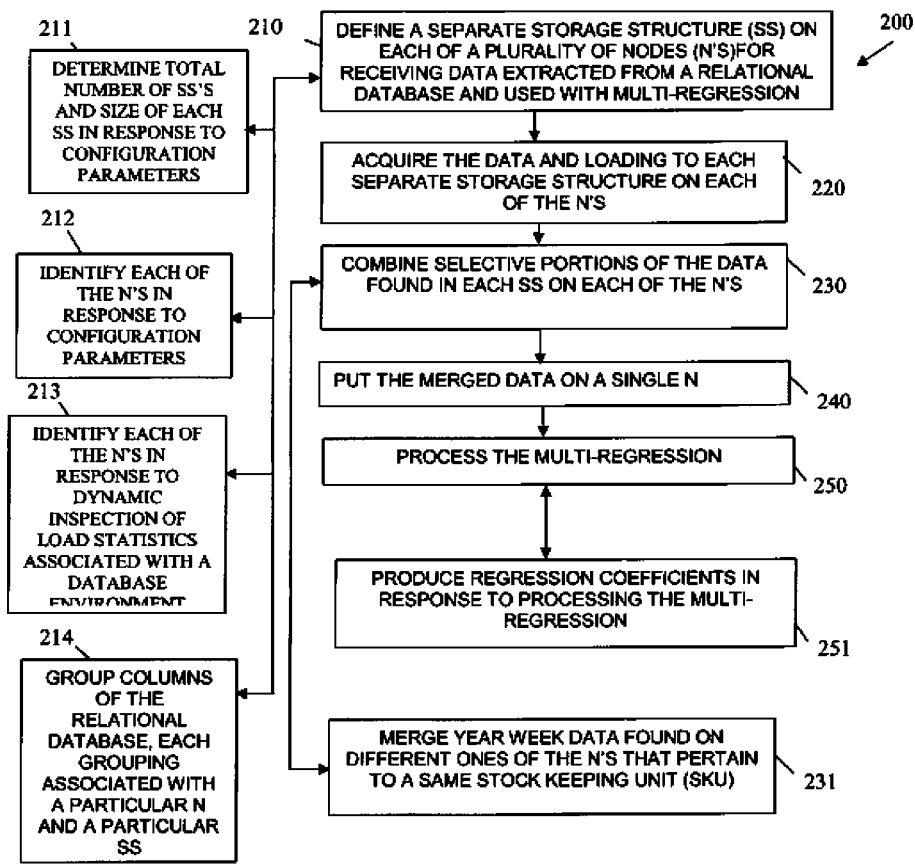
FIG. 3 is a diagram of another method for aggregate UDF processing used with multi-regression, according to an example embodiment.

FIG. 3 is a diagram of another method 200 for aggregate UDF processing used with multi-regression, according to an example embodiment. The method 200 (hereinafter "aggregation service") is implemented in multiple machine-accessible and readable media as instructions that when executed by machines perform the processing reflected in FIG. 3. The aggregation service is accessible over a network. The network may be wired, wireless, or a combination of wired and wireless. As shown in FIG. 3, the aggregation service presents an enhanced view and different aspect of the aggregate UDF service described above and represented by the method 100 of the FIG. 2.

At 210, the aggregation service defines a separate storage structure on each of a plurality of nodes within a database environment. The storage structures house information associated with various groupings of that information as extracted from a relational database. The sum of the groupings may be associated with input values to a database regression analysis service.

According to an embodiment, at 211, the aggregation service determines a total number of storage structures and the size that each storage structure is to be on its respective nodes in response to configuration parameters.

Similarly, at 212, the aggregation service can identify each of the nodes that are to be used for the storage structures in response to configuration parameters.

In yet another situation, at 213, the aggregation service can identify each of the plurality of nodes in response to a dynamic evaluation or the processing load associated with the database environment. Thus, the selection and identity of particular nodes to use can be made based on real-time evaluation of the database environment and corresponding load metrics associated with the nodes of the database environment.

In an embodiment, at 214, the aggregation service groups columns of the relational database, each grouping associated with a particular node and a particular separate storage structure.

At 220, the aggregation service acquires the data and loads that data to each separate storage structure on each of the nodes.

At 230, the aggregation service combines selective portions of the data found in each separate storage structure on each of the nodes.

According to an embodiment, at 231, the aggregation service merges YearWeek data found on different ones of the nodes that pertain to a same stock keeping unit (SKU), as discussed previously.

At 240, the aggregation service processes the multi-regression. Thus, at 241, the aggregation service produces regression coefficients in response to processing the multi-regression.

Figure 4:
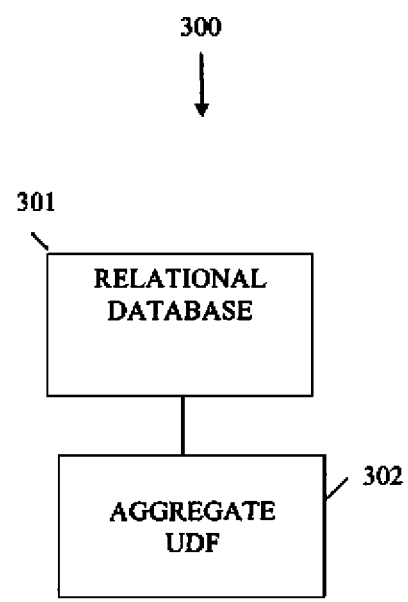
FIG. 4 is an aggregate UDF processing system, according to an example embodiment.

FIG. 4 is an aggregate UDF processing system 300, according to an example embodiment. The aggregate UDF processing system 300 is implemented in a machine-accessible and readable media and is operational over a network and processed by multiple machines of the network. The network may be wired, wireless, or a combination of wired and wireless. In an embodiment, portions of the aggregate UDF processing system 300 implements, among other things the aggregate UDF service and the aggregation service represented by the methods 100 and 200 of FIGS. 2 and 3, respectively.

The aggregate UDF processing system 300 includes a relational database 301 and an aggregate UDF 302. Each of these and their interactions with one another will now be discussed in turn.

The relational database 301 is implemented in a machine-accessible and computer-readable medium, accessible to the aggregate UDF 302. The relational database 301 includes the data that is being used for multi-regression and data captured by an enterprise for goods and services that are tracked by stock keeping units (SKU's).

The aggregate UDF 302 is implemented in a machine-accessible and computer-readable medium, to process on multiple nodes of a database environment. Example processing associated with the aggregate UDF 302 has been discussed previously, with reference to FIGS. 2 and 3, respectively.

The aggregate UDF 302 extracts data from the relational database 301 for use in multi-regression analysis, and populates groupings of that data to separate nodes of the database environment. The aggregate UDF 302 reads and processes multiple rows for the same SKU across the nodes and houses results in a particular one of the nodes. Also, the aggregate UDF 302 processes the multi-regression desired for a particular product or service of an enterprise.

In an embodiment, the aggregate UDF 302 sets up intermediate storage structures on each of the nodes to house the groupings of the extracted data. Also, the aggregate UDF 302 sets up the intermediate storage structures once per SKU on each node.

According to an embodiment, the aggregate UDF 302 generates the groupings by columns associated with the relational database 301. Moreover, the aggregate UDF 302 accumulates data into the intermediate storage structures once per record.

In one situation, the aggregate UDF 302 merges YearWeek data found on different ones of the nodes that pertain to the same SKU.

It is now appreciated how multiple rows or records may be processed at once using an aggregate UDF 302. Heretofore, this has not been practicable or feasible. The techniques presented herein may thus offer substantial performance improvements over existing conventional approaches.

Data Row Packing Mechanisms

At this time, various row packing embodiments will be described. Various configurations are flexible, allowing users to pack any type of data, including multiple types of data, into a VARBYTE via C language structure mapping. Various configurations are also efficient, since Data Definition Language (DDL) design can be simplified: multiple data types can be packed into a single VARBYTE, and referenced using a single common key. UDF design is also simplified, because output can be put into single column format. Packed data is also easy to unpack, since it can be passed in a VARBYTE data type and mapped to a structure as part of the unpacking process. In this way, multiple rows of supporting data can be packed, without using large amounts of intermediate storage.

Figure 5:
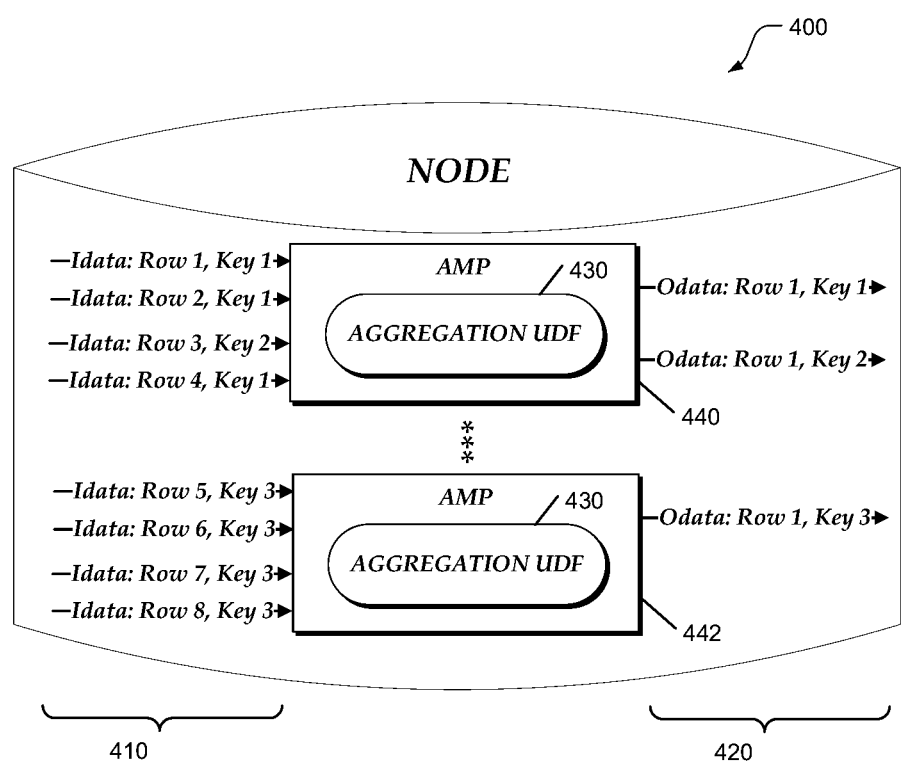
FIG. 5 is a high level work flow diagram of AMP processor operations according to various embodiments of the invention.

FIG. 5 is a high level work flow diagram 400 of AMP processor operations according to various embodiments of the invention. Here it can be seen how aggregation UDF row packing can take input data 410 from several rows, including some data that shares a common key (e.g., keys key1, key2, and key3). By implementing the mechanisms described herein, the input data 410 can be processed using a single AMP (e.g., AMP 440 for key1 data and key2 data, and AMP 442 for key3 data) to provide output data 420 that is sorted according to the common key.

Figure 6:
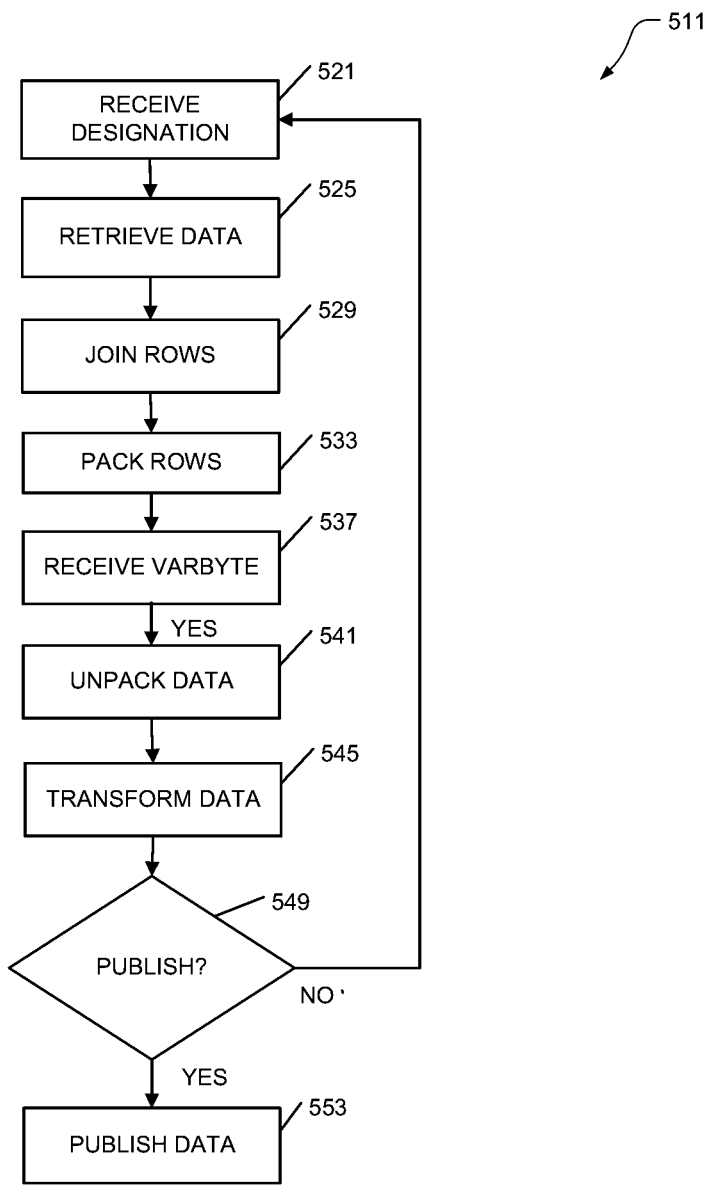
FIG. 6 is a flow diagram illustrating several methods of data row packing according to various embodiments of the invention.

FIG. 6 is a flow diagram illustrating several methods 511 of data row packing according to various embodiments of the invention. For example, in some embodiments, multiple rows of data are designated for processing by a single function. The data are retrieved, and a subset of the data associated with a common key is packed into a single row. The packed data is then transformed by applying the function to the data after it is unpacked. The transformed data can be stored in a medium, perhaps as part of a database or table.

The single row into which the data is packed may comprise a VARBYTE, or a BLOB (binary large object). The single function may comprise a sales forecasting function (e.g., based on sales history and causal indicators, such as weather, economy, etc.) or promotional function (e.g., calculating regression event uplifts, such as a determining that a product that normally sells at a rate of two units/week will be expected to sell at four units/week if promoted in a given manner). Packing the data into a single row allows a single SQL statement to be used for processing much of the data in some embodiments, with the result that the amount of data transported back and forth to disk is reduced, along with the number of SQL statements used overall.

The methods 511 are implemented in a machine-accessible and readable medium, and are operational over processes within and among networks. The networks may be wired, wireless, or a combination of wired and wireless. The methods 511 may be implemented as instructions, which when accessed by a specific machine, perform the processing depicted in FIG. 6.

In some embodiments, the method 511 may comprise a processor-implemented method to execute on one or more processors that perform the method. The method 511 may begin at block 221 with receiving a designation of multiple rows to supply data to a single function. The single function may comprise an aggregate UDF. In some embodiments, the designation of multiple rows to supply data to the single UDS can be made available in a structured query language (SQL) SELECT statement.

The data that is designated to be packed into a single row may comprise multiple types of data, such as integer, character, decimal, etc. A user input device may be used to designate (directly or indirectly, such as by query) the multiple rows that are used to supply the data. Thus, the activity at block 521 may comprise receiving the designation of the data from a user input device.

The method 511 may continue on to block 525 with retrieving the data from at least one storage medium. In some embodiments, if the initial designation of multiple rows includes rows that do not have a common key, then those rows with a common key can be separated out for processing. Thus, the activity at block 525 may comprise retrieving the data as data comprising multiple keys, including a common key (e.g., a key that is common to some of the data, but not all, as shown for key1 of FIG. 5). The activity at block 525 may further include separating the data having the common key into a subset prior to the packing (at block 533).

The data that is designated for retrieval may originate from several AMPs, each having its own copy of the UDF. Thus, processing may be parallel and scalable. In this case, the activity at block 525 may comprise retrieving the data from multiple storage media coupled to multiple access module processors associated with multiple copies of the single function.

The rows that have a common key can be joined using a key join function. Thus, a single SQL statement can be used to retrieve the rows, join them, and then pack them. The packed information can have a key assigned to it, which can be further joined to other packed information. This joined information can be in turn packed again, and passed into the single function for processing. Thus, the method 511 may comprise, at block 529, joining the multiple rows having a common key using a key join function.

The method 511 may continue on to block 533 with packing each of the multiple rows having a common key into a single row. The common key may comprise any number of designations, including a SKU.

The single row of data can be packed into a single VARBYTE variable. Thus, after the data is packed, the method 511 may comprise receiving the single row as received data in a single VARBYTE data type variable at block 537.

The data that is received in a VARBYTE variable can be unpacked by mapping the data into a data structure. The data is unpacked so the single function can process the data. Thus, the method 511 may continue on to block 541 with unpacking the received data by mapping the data into a data structure.

The data structure may comprise a variety of types, including a single-column table. For example, the data structure may comprise a table having a single column, in some embodiments.

The function can operate on the unpacked data regardless of the key designation or key data type, as long as the key is common to the data that is processed. However, a SQL statement that executes the function may use the key to reference the data. The key can be stored into the VARBYTE, or a BLOB, and can form part of the output of the function for further join operations.

The method 511 may continue on to block 545 to include the activity of transforming the data from a first state into a second state by applying the single function to the data. A single AMP can be used to transform the data, which may originate from multiple tables before being packed into a single row.

In some cases, multiple copies of the UDF are executed on a shared nothing architecture. Thus, the activity at block 545 may comprise executing multiple copies of the single function on a shared nothing architecture.

In most embodiments, the transformed data is selected for publication, such as storage to a non-transitory medium, printing to hardcopy, or display on a display. If this is the case, as determined at block 549, then the method 511 may comprise publishing the data in the second state to a display at block 553. If the transformed data is not to be published, as determined at block 549, then the method 511 may proceed to block 521, for further designation of data to be packed.

The Appendix attached hereto and forming a part of this Detailed Description includes source code that realizes one possible embodiment: to receive, retrieve, pack, and transform data according to the mechanisms described herein.

The methods described herein do not have to be executed in the order described, or in any particular order. Moreover, various activities described with respect to the methods identified herein can be executed in repetitive, serial, or parallel fashion. The individual activities of the methods shown in FIGS. 2, 3, and 6 can also be combined with each other and/or substituted, one for another, in various ways. Information, including parameters, commands, operands, and other data, can be sent and received in the form of one or more carrier waves. Thus, many other embodiments may be realized.

The methods shown in FIGS. 2, 3, and 6 can be implemented in various devices, as well as in a computer-readable storage medium, where the methods are adapted to be executed by one or more processors. Further details of such embodiments will now be described.

Figure 7:
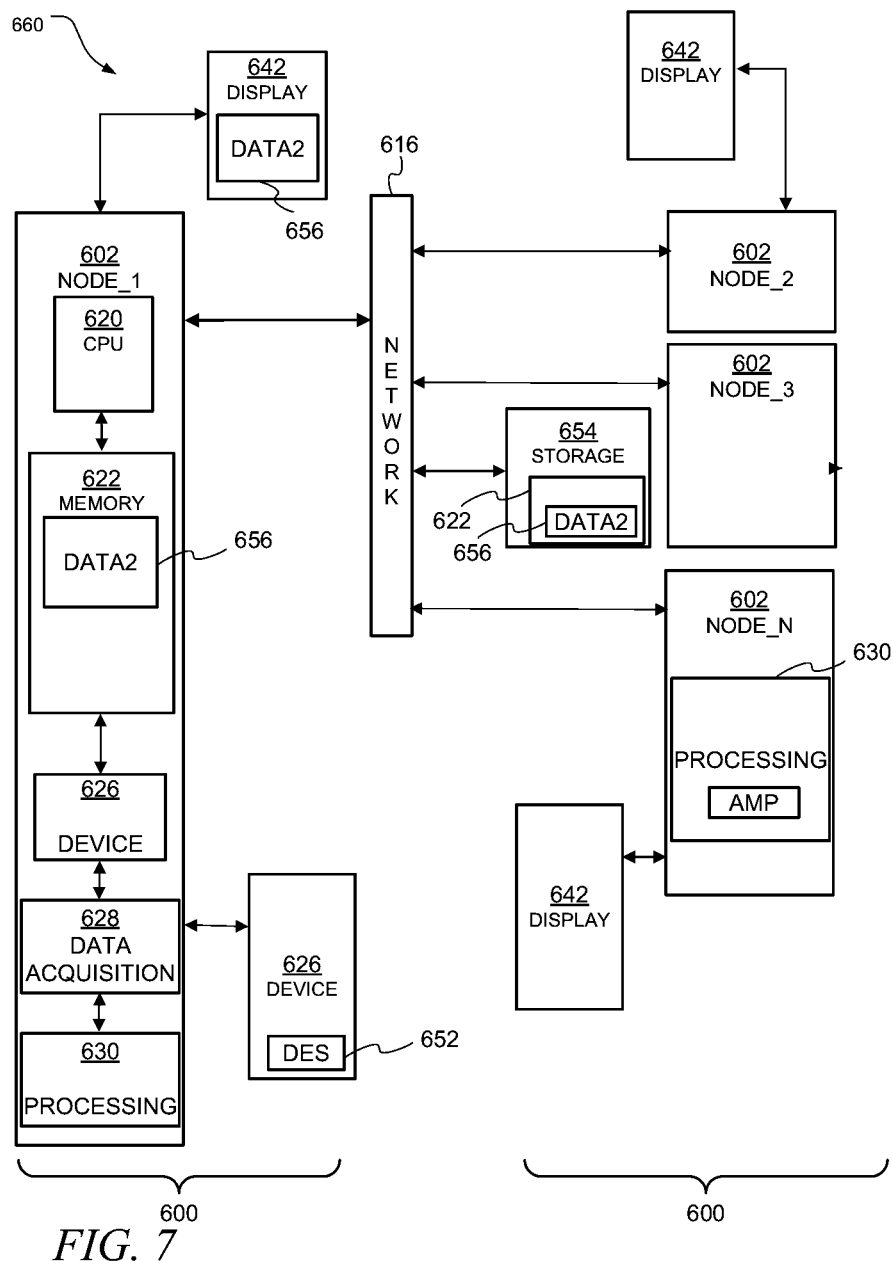
FIG. 7 is a block diagram of apparatus and systems according to various embodiments of the invention.

FIG. 7 is a block diagram of apparatus 600 and systems 660 according to various embodiments of the invention. Here it can be seen that an apparatus 600 used to implement data row packing may comprise one or more processing nodes 602, one or more processors 620, memories 622, one or more user input devices 626, a data acquisition module 628, a processing module 630, and one or more displays 642. The apparatus 600 may comprise a client, a server, or a networked processing node.

The processing nodes 602 may in turn comprise physical machines or virtual machines (e.g., an AMP), or a mixture of both. The nodes 602 may also comprise networked entities, such servers and/or clients. In some cases, the operations described herein can occur entirely within a single node 602.

In some embodiments then, an apparatus 600 may comprise a data acquisition module 628 to receive a designation 652 of multiple rows to supply data 656 to a single function. The apparatus 600 may further comprise a processing module 630 to retrieve the data 656 from at least one storage medium (e.g., storage node 654), to pack each of the multiple rows having a common key into a single row, to transform the data 656 from a first state DATA1 into a second state DATA2 by applying the single function to the data 656, and to publish the data 656 in the second state DATA2, such as by storing the data 656 in the second state DATA2 in a memory (e.g., in the memory 622).

The apparatus 600 may include a display 642, or be coupled to a (remote) display 642. Thus, the apparatus 600 may comprise a human-readable display 642 to display the data 656 in the second state DATA2.

The apparatus 600 may comprise an AMP. Thus, in some embodiments, the processing module 630 comprises an AMP.

Processing the data 656 may be divided between various nodes 602. Thus, the apparatus 600 may comprise a first node (e.g., NODE_1) to house the data acquisition module 628 and a second node (e.g., NODE_N) to house the processing module 630.

The apparatus 600 may be coupled to a separate storage node 654. Thus, the apparatus 600 may comprise a storage node 654 to house the memory 622.

A user input device 626 may be used by an end-user to select or designate data for row packing. The designation 652 may be made indirectly, such as when a user enters a query that results in designating multiple rows for packing. The designation 652 may also be made directly, as when a user indicates specific rows of data that are to be packed. Still further embodiments may be realized.

For example, it can be seen that a system 660 that operates to implement data row packing may comprise multiple instances of the apparatus 600. The system 660 might also comprise a cluster of nodes 602, including physical and virtual nodes. It should be noted that any of the nodes 602 may include any one or more of the elements explicitly shown in nodes NODE_1, NODE_2, NODE_3, . . . NODE_N.

The apparatus 600 and systems 660 may be implemented in a machine-accessible and readable medium that is operational over one or more networks 616. The networks 616 may be wired, wireless, or a combination of wired and wireless. The apparatus 600 and system 660 can be used to implement, among other things, the processing associated with the methods of FIGS. 2, 3, and 6. Modules may comprise hardware, software, and firmware, or any combination of these. Additional embodiments may be realized.

Figure 8:
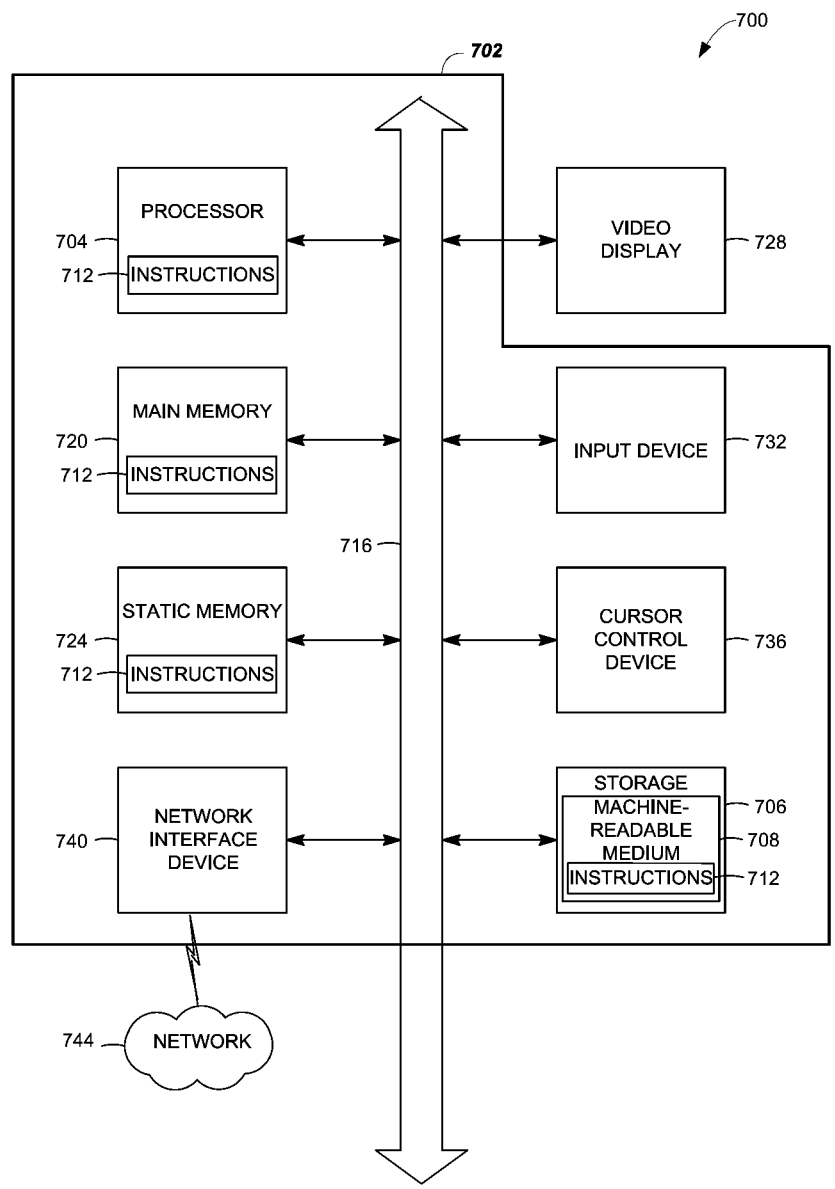
FIG. 8 is a block diagram of an article of manufacture, including a specific machine, according to various embodiments of the invention.

For example, FIG. 8 is a block diagram of an article 700 of manufacture, including a specific machine 702, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-oriented format using an object-oriented language such as Java or C++. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 700 of manufacture, such as a computer, a memory system, a magnetic or optical disk, some other storage device, and/or any type of electronic device or system may include one or more processors 704 coupled to a machine-readable medium 708 such as a memory (e.g., removable storage media, as well as any memory including an electrical, optical, or electromagnetic conductor) having instructions 712 stored thereon (e.g., computer program instructions), which when executed by the one or more processors 704 result in the machine 702 performing any of the actions described with respect to the methods above.

The machine 702 may take the form of a specific computer system having a processor 704 coupled to a number of components directly, and/or using a bus 716. Thus, the machine 702 may be similar to or identical to the apparatus 600 or system 660 shown in FIG. 7.

Turning now to FIG. 8, it can be seen that the components of the machine 702 may include main memory 720, static or non-volatile memory 724, and mass storage 706. Other components coupled to the processor 704 may include an input device 732, such as a keyboard, or a cursor control device 736, such as a mouse. An output device 728, such as a video display, may be located apart from the machine 702 (as shown), or made as an integral part of the machine 702.

A network interface device 740 to couple the processor 704 and other components to a network 744 may also be coupled to the bus 716. The instructions 712 may be transmitted or received over the network 744 via the network interface device 740 utilizing any one of a number of well-known transfer protocols (e.g., HyperText Transfer Protocol). Any of these elements coupled to the bus 716 may be absent, present singly, or present in plural numbers, depending on the specific embodiment to be realized.

The processor 704, the memories 720, 724, and the storage device 706 may each include instructions 712 which, when executed, cause the machine 702 to perform any one or more of the methods described herein. In some embodiments, the machine 702 operates as a standalone device or may be connected (e.g., networked) to other machines. In a networked environment, the machine 702 may operate in the capacity of a server or a client machine in server-client network environment, or as a peer machine in a peer-to-peer (or distributed) network environment.

The machine 702 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 702 is illustrated, the term "machine" shall also be taken to include any collection of machines that individually or jointly execute a set (or multiple sets) of instructions to perform any one or more of the methodologies discussed herein.

While the machine-readable medium 708 is shown as a single medium, the term "machine-readable medium" should be taken to include a single medium or multiple media (e.g., a centralized or distributed database, and/or associated caches and servers, and or a variety of storage media, such as the registers of the processor 704, memories 720, 724, and the storage device 706 that store the one or more sets of instructions 712). The term "machine-readable medium" shall also be taken to include any medium that is capable of storing, encoding or carrying a set of instructions for execution by the machine and that cause the machine 702 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to reduce the number of SQL statements used to process query data, and perhaps, the number of read/write disk access cycles. Increased efficiency and hardware longevity, as well as improved user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a processor;
   a data acquisition module to receive a designation of multiple rows of a database to supply data to a single function; and
   a processing module to:
   retrieve the data from at least one storage medium;
   pack each of the multiple rows, from the retrieved data, having a common key into a single row corresponding to the common key;
   pack the single row into a single variable byte length data type variable:
   receive the single variable byte length data type variable;
   unpack the data from the received single variable byte length data type variable via mapping to a data structure;
   transform the unpacked data from a first state into a second state by applying the single function to the unpacked data; and
   store the transformed data in the second state in a memory.

2. The apparatus of claim 1, further comprising:
   a human-readable display to display the transformed data in the second state.

3. The apparatus of claim 1, wherein the processing module comprises: a single access module processor.

4. The apparatus of claim 1, further comprising:
   a first node to house the data acquisition module; and
   a second node to house the processing module.

5. The apparatus of claim 1, further comprising:
   a storage node to house the memory.

6. A method comprising:
   receiving a designation of multiple rows of a database to supply data to a single function;
   retrieving the data from at least one storage medium;
   packing, using one or more processors, each of the multiple rows, from the retrieved data, having a common key into a single row corresponding to the common key;
   packing the single row into a single variable byte length data type variable;

receiving the single variable byte length data type variable;
unpacking the data from the received single variable byte length type variable via mapping to a data structure; and
transforming, using the one or more processors, the unpacked data from a first state into a second state by applying the single function to the unpacked data.

7. The method of claim 6, wherein transforming the unpacked data comprises:
transforming the unpacked data using a single access module processor.

8. The method of claim 6, further comprising:
joining the multiple rows having a common key using a key join function.

9. The method of claim 6, wherein the data structure comprises:
a table having a single column.

10. The method of claim 6, wherein the single function comprises an aggregate user defined function.

11. The method of claim 6, wherein the retrieved data comprises multiple different types of data.

12. The method of claim 6, wherein receiving the designation of multiple rows of the database comprises:
receiving the designation of multiple rows of the database from a user input device.

13. A method comprising:
receiving a designation of multiple rows of a database to supply data to a single user defined function made available in a structured query language SELECT statement;
retrieving the data from at least one storage medium;
packing, using one or more processors, each of the multiple rows, from the retrieved data, having a common key into a single row corresponding to the common key;
packing the single row into a single variable byte length data type variable;
receiving the single variable byte length data type variable;
unpacking the data from the received single variable byte length type variable via mapping to a data structure; and
transforming the unpacked data from a first state into a second state by applying the single user defined function to the unpacked data using a single access module processor.

14. The method of claim 13, wherein the common key comprises:
a stock keeping unit (SKU).

15. The method of claim 13, wherein retrieving the data further comprises:
retrieving the data as data comprising multiple keys, including the common key; and
separating the data having the common key into a subset prior to packing the multiple rows in a single row.

16. The method of claim 13, wherein retrieving the data further comprises:
retrieving the data from multiple storage media coupled to multiple access module processors associated with multiple copies of the single user defined function.

17. The method of claim 16, comprising:
executing the multiple copies of the single user defined function on a shared nothing architecture.

18. The method of claim 13, further comprising:
publishing the transformed data in the second state to a display.

* * * * *